United States Patent [19]

Yamada et al.

[11] Patent Number: 4,610,841
[45] Date of Patent: Sep. 9, 1986

[54] CORROSION PREVENTING DEVICE FOR IN-PILE STRUCTURES OF HELIUM GAS-COOLED REACTOR

[75] Inventors: Masao Yamada; Haruo Kawakami, both of Kanagawa, Japan

[73] Assignee: Fuji Electric Company Ltd., Kanagawa, Japan

[21] Appl. No.: 582,519

[22] Filed: Feb. 22, 1984

[30] Foreign Application Priority Data

Feb. 22, 1983 [JP] Japan ................................ 58-28355

[51] Int. Cl.⁴ .............................................. G21C 9/00
[52] U.S. Cl. ................................................... 376/305
[58] Field of Search ....................... 376/305, 306, 383; 422/9, 177

[56] References Cited

U.S. PATENT DOCUMENTS

4,415,537 11/1983 Vine et al. ............................ 422/177

FOREIGN PATENT DOCUMENTS

1286264 8/1972 United Kingdom ................ 376/305

Primary Examiner—Deborah L. Kyle
Assistant Examiner—Richard W. Wendtland
Attorney, Agent, or Firm—Sughrue, Mion, Zinn, Macpeak, and Seas

[57] ABSTRACT

A corrosion preventing device for use in an in-pile structure of a helium gas-cooled reactor for removing gaseous oxidating components from a primary cooling gas in a pressure vessel of the reactor to thus prevent oxidation of graphite members of the reactor pile. An oxidation product consuming member is provided in series with a primary cooling gas supply pipeline or a bypass pipeline thereof along with a device for heating the oxidation product consuming member. The oxidation product consuming member may be a single cylindrical member or a bundle of rods having a large number of through holes formed therein in a honeycomb pattern in the lengthwise direction thereof or a large number of balls. The material of the oxidation product consuming member should have a high affinity for oxidizing impurities at elevated temperatures. Preferably, the material of the oxidation product consuming member is carbon or graphite.

5 Claims, 12 Drawing Figures

CORROSION PREVENTING DEVICE FOR IN-PILE STRUCTURES OF HELIUM GAS-COOLED REACTOR

BACKGROUND OF THE INVENTION

The present invention relates to a corrosion preventing device for in-pile graphite structures, fuel and the like of a helium gas-cooled nuclear reactor against water or air ingress accidents.

In a helium gas-cooled reactor, graphite is employed to form in-pile structures or fuel. Thus, because $H_2O$, and $O_2$ and the like included in helium gas supplied into the reactor as a coolant have the action of accelerating oxidation corrosion of the graphite structures, a coolant purifying device formed of activated carbon or a molecular sieve was provided in a coolant supply pipeline system in order to remove oxidizing impurities such as $H_2O$ and $O_2$ from the helium gas supplied into the reactor. However, since this coolant purifying device was designed only to remove oxidizing impurities from the supplied coolant gas in a normal operational state, it is not able to remove $O_2$ and $H_2O$ when a large quantity of air or air-helium mixed gas rushes abruptly into the reactor, as may occur if, for instance, the primary cooling pipeline accidentally ruptures. Particularly, if an accident occurs where the pressure drops abruptly, gas may rush into the reactor without passing through the coolant purifying device. In such a case, there is possibility that graphite members of the reactor may suffer severe oxidation corrosion. These circumstances will be described with reference to FIG. 1.

FIG. 1 is a vertical sectional view showing schematically a helium gas-cooled reactor. In FIG. 1, reference numeral 11 designates a ruptured portion of a primary cooling gas supply pipeline. An inwardly rushing gas flowing through the ruptured portion 11 is designated by an arrow 12. Other arrows designate the flow of the coolant helium gas inside the reactor. The air or helium-air mixed gas rushing through ruptured portion 11 generally includes both $O_2$ and $H_2O$ components in relatively high concentrations. The oxidizing action of $O_2$ and $H_2O$ contained in the invading gas is accelerated by the elevated temperature inside the reactor. Accordingly, in-pile structures, such as a plenum post 13 and fuel 14, are oxidized and corroded. The temperature inside the reactor will be lowered by a cooling system panel 15 provided in the rear. However, it takes a relatively long time for the reactor to be cooled sufficiently because of the large thermal capacity of the in-pile structures. During the cooling period, oxidizing of the graphite members of the pile unavoidably will occur.

SUMMARY OF THE INVENTION

The invention was achieved in view of the foregoing circumstances, and it is an object of this invention to remove oxidizing components from the air or air-helium mixed gas invading the reactor, for example, at the time of rupture in the cooling gas supply pipeline system of the reactor, thereby to suppress oxidation corrosion of the in-pile graphite members.

The invention achieves the foregoing object by interposing, in series with the primary cooling gas supply pipeline system or as a bypass for the same, a corrosion preventing device including an oxidation product consuming member in the form of a bundle of rods or a cylinder formed with a large number of through holes in a honeycomb pattern in the lengthwise direction or a large number of balls made of a material having a high affinity for oxidizing impurities at elevated temperatures, and means for heating the oxidation product consuming member. Both the oxidation product consuming member and the heating means are mounted in a pipe.

Further, the heating means for the oxidation product consuming member may be realized by providing electrodes on both end portions of the oxidation product consuming member and supplying electric power to the electrodes, thereby to heat the oxidation product consuming member directly. Also, the heating means for the oxidation product consuming member may be realized by supplying electric power to an electric heater unit mounted in an inner wall portion of the pipe incorporating the oxidation product consuming member, thereby to indirectly heat the oxidation product consuming member.

DESCRIPTION OF THE PREFERRED EMBODIMENTS

Preferred embodiments of the invention will now be described with reference to the drawings.

Figure 2:
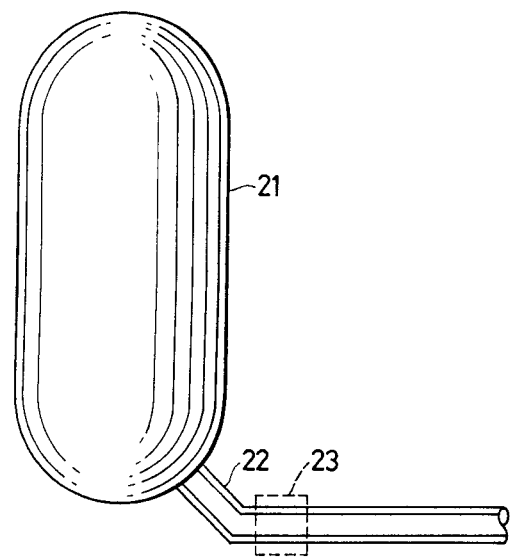
FIGS. 2 and 3 are schematic diagrams showing the installation of a preferred embodiment of a corrosion preventing device of the invention.
Figure 3:
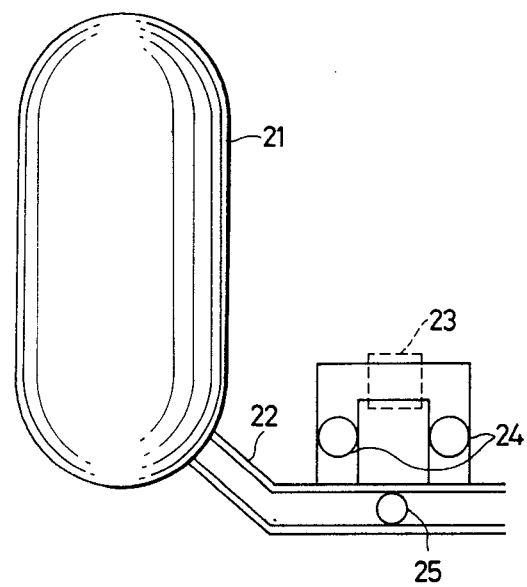

FIGS. 2 and 3 are schematic diagrams showing a first preferred embodiment of a corrosion preventing device of the invention coupled in series with a portion of a primary cooling gas supply pipeline system and provided in the form of a bypass. In FIGS. 2 and 3, reference member 21 designates the pressure vessel of the reactor, 22 the primary cooling gas supply pipeline system, 23 the subject corrosion preventing device, and 24 and 25 valves. The manner of coupling the subject corrosion preventing device directly to the primary cooling gas supply pipeline system as shown in FIG. 2 is superior to the case in which it is used as a bypass in relation to the primary cooling gas supply pipeline system as shown in FIG. 3. Particularly, the former provides a high degree of reliability on starting and a high effectiveness of preventing corrosion of the in-pile structures because the subject device can be mounted close to the reactor core. However, if the space available for mounting is limited or if the materials used to fabricate the device are restricted because of exposure to elevated temperatures, the arrangement of FIG. 3 may be employed. In the arrangement shown in FIG. 3, manipulation of the valves 24 and 25 is required. That is, during normal operations, the valves 24 and 25 are closed and the valve 25 is opened to supply the primary cooling gas, and at the time of an accident in the primary cooling gas supply pipeline system, the valve 24 must be opened and the valve 25 closed to bypass the gas.

Figure 4B:
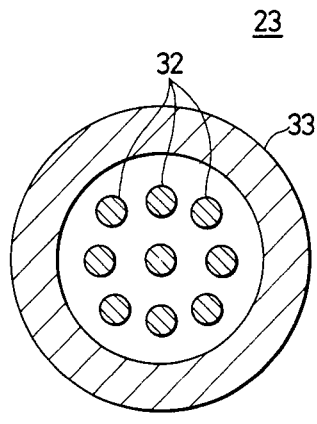
FIG. 4B is a cross-sectional view taken along a line A—A' in the FIG. 4A.
Figure 4A:
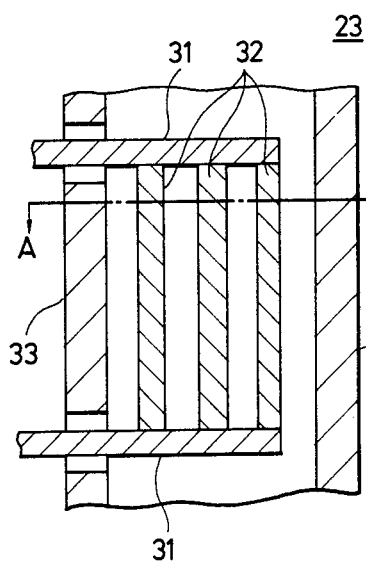
FIG. 4A is a lengthwise sectional view of the above preferred embodiment of a corrosion preventing device of the invention.

FIG. 4A is a lengthwise cross-sectional view of the corrosion preventing device according to the first preferred embodiment of the invention, and FIG. 4B is a cross-sectional view taken along a line A—A' in FIG. 4A. In FIGS. 4A and 4B, reference numeral 31 designates an electrode, 32 an oxidation product consuming member in the form of a bundle of rods made of graphite, carbon, tantalum, copper or the like, and 33 is a pipe. The oxidation product consuming member 32 is maintained at room temperature during normal operation, and at the time of an accident in the primary cooling gas supply pipeline, the oxidation product consuming member 32 is directly powered through electrodes 31 and heated to cause a reaction with the oxidizing gas (such as $O_2$) contained in the primary cooling gas.

If the consuming member is made of graphite or carbon, the oxidizing reaction product will be a gas such as CO or $CO_2$ which can be simply treated after reaction. On the other hand, if the oxidation product consuming member is made of tantalum or copper, the oxidation product will be a metallic oxide, which is liable to be activated upon entering the reactor. Accordingly, treatment in such a case is difficult. Comparing graphite with carbon, graphite has a smaller electrical resistivity and hence requires a larger current for heating than carbon, and it is slower in reaction speed than carbon. Thus, carbon is generally superior to graphite for the oxidation product consuming member. However, since carbon is difficult to machine compared to graphite, graphite and carbon can be selectively employed depending upon the shape of the oxidation product consuming member. It is to be noted that the oxidation product consuming member must be shaped to provide a large surface area in contact with the primary cooling gas and a high coefficient of matter migration with respect to the primary cooling gas.

Figure 5B:
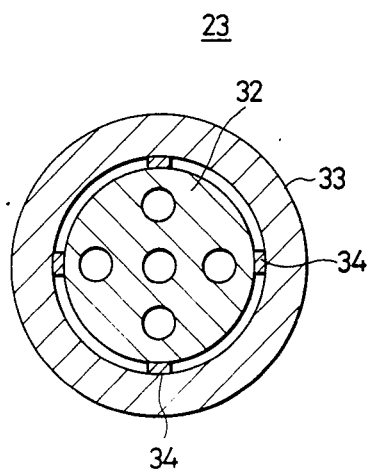
FIG. 5B is a cross-sectional view taken along a line B—B' in FIG. 5A.
Figure 5A:
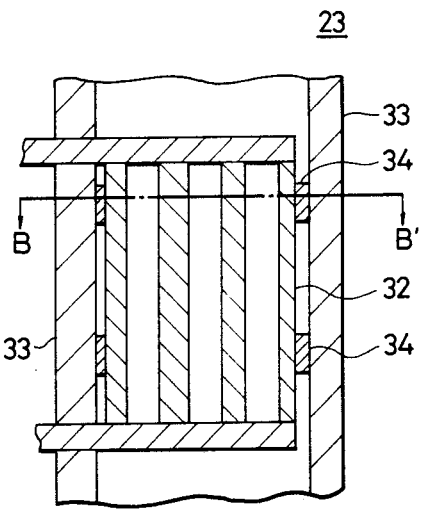
FIG. 5A is a lengthwise cross-sectional view of a corrosion preventing device constructed according to a second preferred embodiment of the invention.

FIG. 5A is a lengthwise cross-sectional view of a corrosion preventing device constructed according to a second preferred embodiment of the invention, and FIG. 5B is a cross-sectional view taken along a line B—B' in FIG. 5A. In FIGS. 5A and 5B, elements similar to those of FIGS. 4A and 4B are identified by like reference numerals. Further, reference numeral 32 identifies an oxidation product consuming member in the form of a cylinder made of graphite or carbon and having a large number of through holes formed in a honeycomb pattern in the lengthwise direction. The member 32 is secured to pipe 33 by ribs 34. Similar to the embodiment of FIGS. 4A and 4B, the oxidation product consuming member 32 is heated with electrodes 31.

Figure 6B:
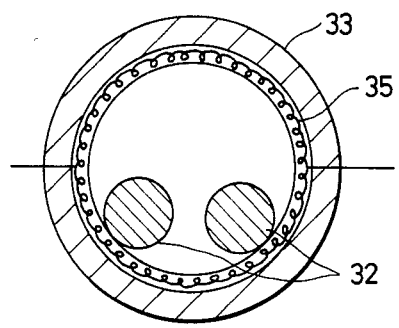
FIG. 6B is a cross-sectional view taken along a line C—C' in FIG. 6A.
Figure 6A:
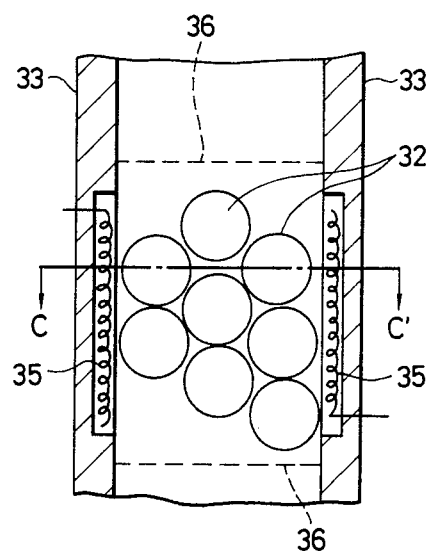
FIG. 6A is a lengthwise cross-sectional view of a still another preferred embodiment of a corrosion preventing device of the invention.

FIG. 6A shows a lengthwise cross-sectional view of a corrosion preventing device according to a third preferred embodiment of the invention, and FIG. 6B is a cross-sectional view taken along a line C—C' in FIG. 6A. In these figures, reference numeral 32 indicates an oxidation product consuming member which takes the form of a large number of balls made of graphite or carbon, 33 is a pipe, and 35 is a heater unit mounted in the inner wall portion of the pipe 33 and which is used to heat indirectly the oxidation product consuming member 32 upon being powered from an external supply. Reference numeral 36 indicates a mesh for accommodating the oxidation product consuming member.

If an accident occurs in the primary coupling gas supply pipeline system, it is necessary that a small amount of coolant be supplied to the reactor to remove the heat of the fuel. However, a loss in pressure of the corrosion preventing device can be sufficiently compensated for by natural convection or by circulation of a gaseous substance.

Figure 7:
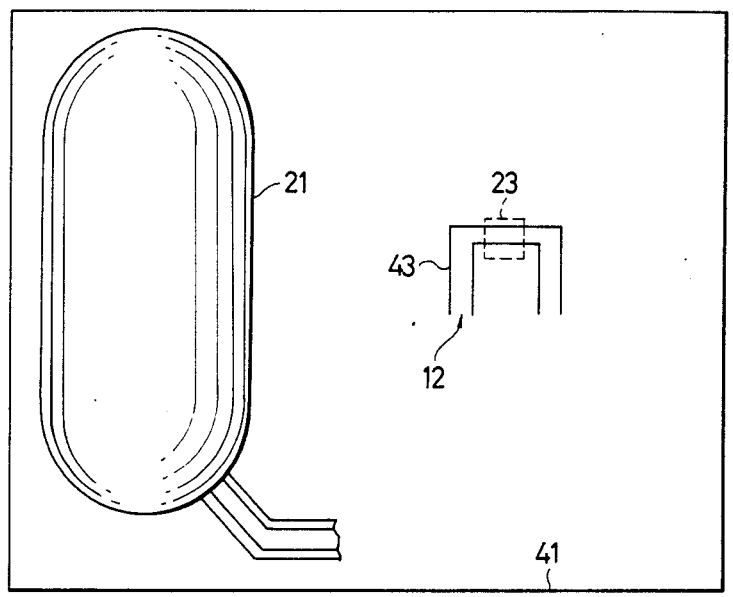
FIG. 7 is a diagram showing a corrosion preventing device of the invention mounted in a containment vessel and operating an open-circuit state.

FIG. 7 is a diagram showing the arrangement of a corrosion preventing device according to the invention used in an open-circuit configuration in a containment vessel, in which reference numeral 12 indicates a current of the primary cooling gas, 21 the pressure vessel of the reactor, 23 the corrosion preventing device, 41 the containment vessel, and 43 the pipeline.

Figure 8:
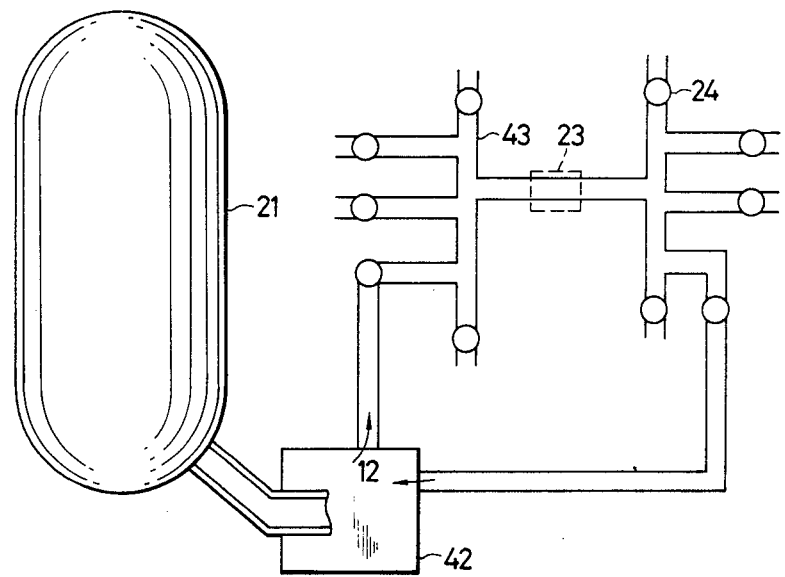
FIG. 8 is a diagram showing a corrosion preventing device of the invention coupled to an oxygen consumption pipeline installed in compartments to which the primary cooling gas supply pipeline is coupled.

In FIG. 8, the containment vessel has plural compartments 42, to each of which the primary cooling gas supply pipeline is coupled. Pipelines for oxygen consumption are connected to each compartment 42 through valves from a common corrosion preventing device. Upon the occurrence of an accident, the valves in the pipelines coupled to a compartment 42 where the primary cooling gas supply pipeline has fractured are opened to bring the corrosion preventing device into operation. Other elements in FIG. 8 corresponding to those of FIG. 7 bear the same reference numerals.

As an example, if the oxidation product consuming member is a graphite cylinder 100 cm in length and 1 cm in inner diameter through which a helium-air mixture with an oxygen concentration of 15% is forced to flow at a rate of 100 cm/sec, the oxygen concentration is reduced to approximately 1% at the cylinder outlet if the temperature of graphite is 900° C. In operation, the oxidation product consuming member is itself consumed over time, but oxidation of the in-pile structures and fuel is suppressed because the in-pile temperature lowers gradually during a corresponding time period.

Figure 1:
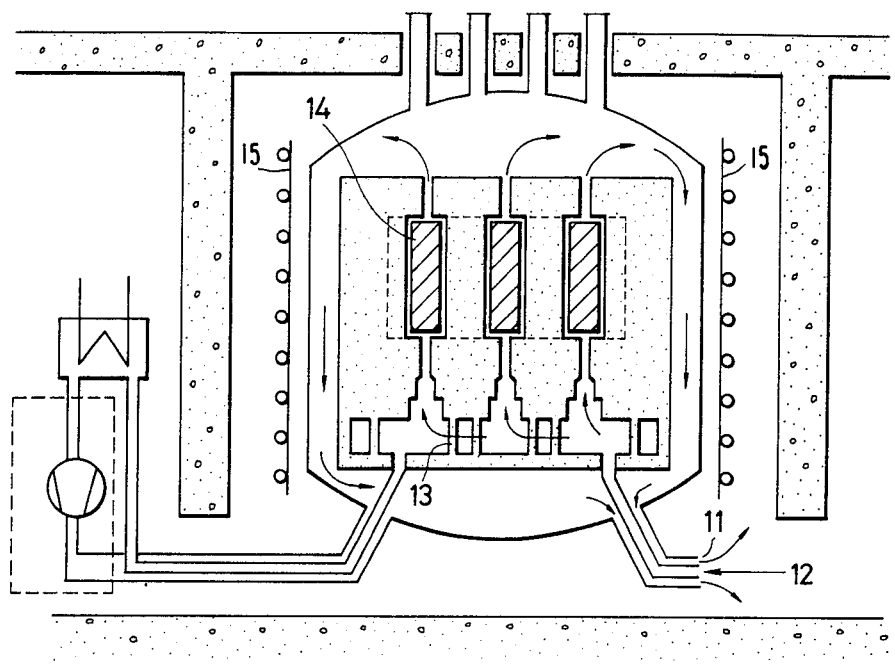
FIG. 1 is a vertical sectional view showing schematically a helium gas-cooled reactor.
Figure 9:
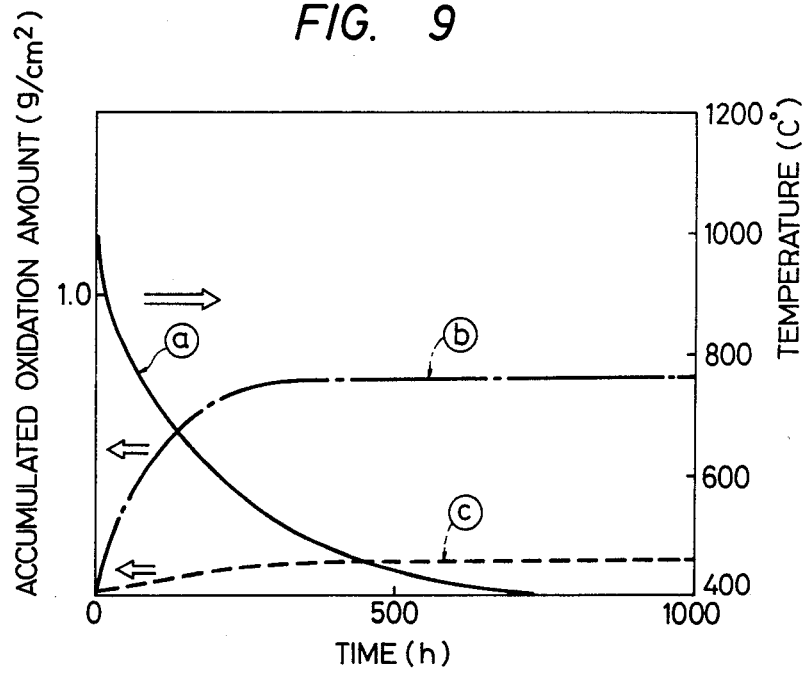
FIG. 9 is a graph showing the relation of an amount of accumulated oxidation and the temperature of a plenum post in the reactor core with respect to the operating time of the corrosion preventing device of the invention.

FIG. 9 is a graph showing the relation between the accumulated amount of oxidation products and the temperature of the plenum post inside the core relative to the operating time of the corrosion preventing device of the invention started upon the occurrence of an accident in the primary cooling gas supply pipeline system. In FIG. 9, (a) indicates the relationship between the operating time and the plenum post's temperature. Specifically, the temperature of the plenum post is initially 1000° C., but lowers to 600° C. 200 hours after occurrence of the accident in the primary cooling gas supply pipeline system, at which point the rate of reaction between the graphite and air lowers remarkably in proportion to the rate at which the plenum post's temperature drops. To the contrary, if no corrosion preventing device for the in-pile structures is provided, the accumulated amount of oxidation product on the plenum post inside the core produced upon an accident in the primary cooling gas supply pipeline system varies as shown by (b) in FIG. 9. Specifically, the oxidation amount of the plenum post 1000 hours after the accident reaches approximately 0.7 g/cm², at which point the strength of the plenum post has fallen to approximately 25% of its initial strength before the accident. However, by employing a corrosion preventing device according to the invention, the accumulated oxidation amount on the plenum post varies as shown by (c) in FIG. 9, becoming 0.1 g/cm² 1000 hours after the accident in the primary cooling gas supply pipeline system, at which point its strength is still not less than approximately 50% of its initial strength.

In the arrangement shown in FIG. 7, the oxygen inside the containment vessel is effectively and gradually consumed, and oxidation of the in-pile graphite structures is effectively suppressed, even during normal operations.

It should be noted that in the arrangement of FIG. 8 the effect of the corrosion preventing device is greater than in the arrangement shown in FIG. 7.

We claim:

1. In a helium gas-cooled nuclear reactor having a primary cooling gas and a pressure vessel, a corrosion preventing device, comprising: an oxidation product consuming member comprising a material having a high affinity for oxidizing impurities at an elevated temperature, said oxidation product consuming member being a member selected from the group consisting of a bundle of rods and a cylinder having a large number above the temperature of said primary cooling gas of through holes formed therein in a honeycomb pattern in the lengthwise direction and a large number of balls; and means for heating said oxidation product consuming member, said oxidation product consuming member and said heating member being incorporated in a pipe, said device being interposed in series with a primary cooling gas supply pipeline or as a bypass of said primary cooling gas supply pipeline of said reactor.

2. The corrosion preventing device as claimed in claim 1, wherein said means for heating said oxidation product consuming member comprises electrodes attached to both end portions of said oxidation product consuming member, whereby said oxidation product consuming member is directly heated upon powering of said electrodes from a source external of said pipe.

3. The corrosion preventing device as claimed in claim 1, wherein said means for heating said oxidation product consuming member comprises a heating unit mounted on an inner wall portion of said pipe containing said oxidation product consuming member, whereby said oxidation product consuming member is indirectly heated upon powering said heating unit from a source external of said pipe.

4. The corrosion preventing device as claimed in claim 1, wherein said material having a high affinity for oxidizing impurities at an elevated temperature comprises carbon.

5. The corrosion preventing device as claimed in claim 4, wherein said material having a high affinity for oxidizing impurities at an elevated temperature comprises graphite.

* * * * *